United States Patent
Liao et al.

(10) Patent No.: US 10,193,692 B2
(45) Date of Patent: Jan. 29, 2019

(54) IDENTIFICATION TOKEN

(71) Applicant: Nokia Technologies Oy, Espoo (FI)

(72) Inventors: Zhuoyuan Liao, Beijing (CN); Song Liu, Beijing (CN); Bin Gao, Beijing (CN); Chaobin Guo, Beijing (CN); Naichen Cui, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/778,485

(22) PCT Filed: Mar. 20, 2013

(86) PCT No.: PCT/CN2013/072918
§ 371 (c)(1),
(2) Date: Sep. 18, 2015

(87) PCT Pub. No.: WO2014/146259
PCT Pub. Date: Sep. 25, 2014

(65) Prior Publication Data
US 2016/0164680 A1  Jun. 9, 2016

(51) Int. Cl.
*H04L 9/32* (2006.01)
*H04W 4/14* (2009.01)
(Continued)

(52) U.S. Cl.
CPC ........... *H04L 9/3213* (2013.01); *H04W 12/04* (2013.01); *H04L 63/0236* (2013.01);
(Continued)

(58) Field of Classification Search
CPC ......... H04L 63/02; H04L 63/04; H04L 63/10; H04L 9/32; G06F 9/32
See application file for complete search history.

(56) References Cited

U.S. PATENT DOCUMENTS 6,484,197 B1 * 11/2002 Donohue .............. H04L 12/585
709/206
7,010,565 B2 * 3/2006 Sampson .......... G06F 17/30067
707/E17.01
(Continued)

FOREIGN PATENT DOCUMENTS

CN  100543714 C  9/2009
CN  102088420 A  6/2011
(Continued)

OTHER PUBLICATIONS

Applied Cryptography by Bruce Schneier. Second Edition. Publisher: John Wiley & Sons, Inc. Year: 1996.*
(Continued)

*Primary Examiner* — Madhuri R Herzog
(74) *Attorney, Agent, or Firm* — Alston & Bird LLP

(57) ABSTRACT

An approach for obtaining and applying an identification token is provided. One approach includes obtaining one or more tokens for screening incoming communication items to a first user, encrypting the one or more tokens to create respective one or more encrypted tokens, and providing the one or more encrypted tokens to one or more second users for subsequent use in communication to the first user to enable the first user to screen incoming communication items. Another approach includes receiving an indication of one or more incoming communication items addressed to a first user and an encrypted token associated with one or more identifiers characterizing the one or more communication items, decrypting the encrypted token to derive a decrypted token to enable verification of the token, and applying a predetermined rule based on the outcome of the verification to screen incoming communication items.

20 Claims, 7 Drawing Sheets

(51) Int. Cl.
*H04L 29/06* (2006.01)
*H04W 12/04* (2009.01)
*H04W 12/08* (2009.01)

(52) U.S. Cl.
CPC ......... *H04L 2463/062* (2013.01); *H04W 4/14* (2013.01); *H04W 12/08* (2013.01)

(56) References Cited

U.S. PATENT DOCUMENTS

| | | | | |
|---|---|---|---|---|
| 9,202,218 | B1* | 12/2015 | Crisman | G06Q 30/00 |
| 2005/0125667 | A1* | 6/2005 | Sullivan | H04L 51/12 |
| | | | | 713/170 |
| 2006/0015566 | A1* | 1/2006 | Sampson | H04L 51/12 |
| | | | | 709/206 |
| 2007/0118891 | A1 | 5/2007 | Buer | |
| 2012/0239936 | A1 | 9/2012 | Holtmanns et al. | |
| 2013/0332544 | A1* | 12/2013 | Brian | H04L 51/04 |
| | | | | 709/206 |
| 2014/0025753 | A1* | 1/2014 | Gronowski | H04L 63/0421 |
| | | | | 709/206 |

FOREIGN PATENT DOCUMENTS

| | | |
|---|---|---|
| CN | 102546574 A | 7/2012 |
| CN | 102651734 A | 8/2012 |
| CN | 102656841 A | 9/2012 |

OTHER PUBLICATIONS

International Search Report and Written Opinion for Application No. PCT/CN2013/072918 dated Dec. 19, 2013.
Dawson, F. et al., *vCard MIME Directory Profile*, RFC 2426 (Sep. 1998) 42 pages.
Howes, T. et al., *A MIME Content-Type for Directory Information*, RFC 2425 (Sep. 1998) 33 pages.
Josefsson, S., *The Base16, Base32, and Base64 Data Encodings*, RFC 4648 (Oct. 2006) 18 pages.
Perreault, S., *vCard Format Specification*, RFC 6350 (Aug. 2011) 74 pages.
Perreault, S., *xCard: vCard XML Representation*, RFC 6351 (Aug. 2011) 22 pages.
GSM 02.87: GSM Digital Cellular Telecommunication System (Phase 2+); User-to-User Signaling (UUS); Service Description, Stage 1, V.5.2.1, European Telecommunications Standards Institute (ETSI) (Nov. 1997) 17 pages.
Office Action for corresponding Chinese Application No. 201380076698.9 dated Jan. 3, 2018 with English Translation, 13 pages.
Office Action for Chinese Application No. 2013800766989 dated Jul. 16, 2018, 14 pages.

* cited by examiner a) TYPE = PRIORITY b) TYPE = PRIORITY; SUB-TYPE = URGENT

TYPE = PRIORITY; SUB-TYPE = NORMAL

TYPE = PRIORITY; SUB-TYPE = LOW c) TYPE = CONTEXT; SUB-TYPE = BUSINESS

TYPE = CONTEXT; SUB-TYPE = FAMILY

TYPE = CONTEXT; SUB-TYPE = FRIEND a) TYPE = PRIORITY; SUB-TYPE = URGENT | TYPE = CONTEXT; SUB-TYPE = BUSINESS b) TYPE = PRIORITY; SUB-TYPE = NORMAL | TYPE = CONTEXT; SUB-TYPE = FRIEND a)

| TYPE = OWNER; NAME = Mike Smith | TYPE = OWNER; EMAIL = mike.smith@foo.com |
|---|---|
| TYPE = OWNER; PHONE = 12125551234 | | b)

| TYPE = OWNER; NAME-1 = Mike Smith | TYPE = OWNER; PHONE-1 = 12125551234 |
|---|---|
| TYPE = OWNER; NAME-2 = John Doe | TYPE = OWNER; PHONE-2 = 12125551235 |
| TYPE = OWNER; NAME-3 = Joe Average | TYPE = OWNER; PHONE-3 = 12125551236 |

Figure 4 a)

| TYPE = PRIORITY; SUB-TYPE = URGENT | TYPE = CONTEXT; SUB-TYPE = BUSINESS |
|---|---|
| TYPE = OWNER; NAME = Mike Smith | TYPE = OWNER; EMAIL = mike.smith@foo.com |
| TYPE = OWNER; PHONE = 12125551234 | | b)

| TYPE = PRIORITY; SUB-TYPE = NORMAL | TYPE = CONTEXT; SUB-TYPE = FAMILY |
|---|---|
| TYPE = OWNER; NAME-1 = Jane Doe | TYPE = OWNER; PHONE-1 = 12125551237 |
| TYPE = OWNER; NAME-2 = Jack Doe | TYPE = OWNER; PHONE-2 = 12125551238 |
| TYPE = OWNER; NAME-3 = Jill Doe | TYPE = OWNER; PHONE-3 = 12125551239 |

Figure 5

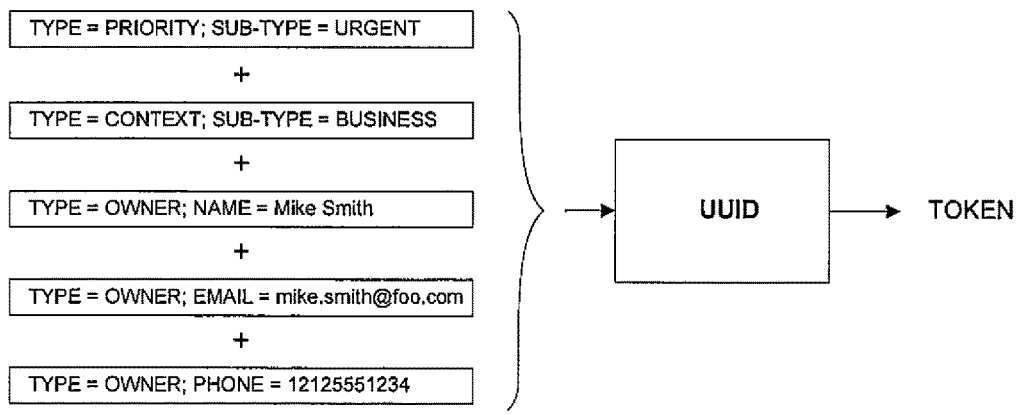

Figure 6

IDENTIFICATION TOKEN

CROSS REFERENCE TO RELATED APPLICATION

This application is a national phase entry of International Application No. PCT/CN2013/072918, filed Mar. 20, 2013, the entire contents of which are hereby incorporated by reference.

TECHNICAL FIELD

The example and non-limiting embodiments of the present invention relate to an identification token that can be used to indicate the type and/or origin of an incoming communication. In particular, at least some example embodiments relate to a method, an apparatus, a computer program and a system for obtaining and providing an identification token for one or more third parties to subsequently use and/or receiving and handling an identification token to screen and process incoming communication items effectuated with the identification token.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Communication items of a communication system such as telephone calls, short messaging service (SMS) messages, multimedia messages (MMS), instant messages, email messages etc. are typically received with a source identifier indicating the origin of the respective communication item. However, for example the sender information in an email message can be rather easily faked and hence a user may be reluctant to open any email from a previously unknown email address or receiving a suspicious email from a known email address. As another example, a user may be reluctant to answer a telephone call received from an unknown number e.g. due to being busy or due to unwillingness to accept calls from unrecognized callers.

As a related issue, the present communication systems fail to provide a reliable approach for characterizing an incoming communication item. While e.g. many email systems enable setting a flag indicative of the importance of a message, this approach is quite often misused, hence undermining the applicability of such a flag. Moreover, many communication systems, such as telephone communication systems, do not provide any approach for characterizing the priority or other aspects of an incoming call or message.

SUMMARY

According to an example embodiment, an apparatus is provided, the apparatus comprising at least one processor and at least one memory including computer program code for one or more programs, the at least one memory and the computer program code configured to, with the at least one processor, cause the apparatus at least to obtain one or more tokens for screening incoming communication items to a first user, wherein a token is associated with one or more identifiers characterizing one or more communication item accompanying the token, to encrypt the one or more tokens to create respective one or more encrypted tokens and to provide the one or more encrypted tokens to one or more second users for subsequent use in communication to the first user to enable the first user to screen incoming communication items.

According to another example embodiment, another apparatus is provided, the apparatus comprising at least one processor and at least one memory including computer program code for one or more programs, the at least one memory and the computer program code configured to, with the at least one processor, cause the apparatus to perform at least to receive an indication of one or more incoming communication items addressed to a first user and an encrypted token associated with one or more identifiers characterizing the one or more communication items, to decrypt the encrypted token to derive a decrypted token to enable verification of the token, and to apply a predetermined rule to screen incoming communication items, wherein said predetermined rule determines handling of the one or more incoming communication items at least on basis of the outcome of the verification.

According to another example embodiment, another apparatus is provided, the apparatus comprising means for obtaining one or more tokens for screening incoming communication items to a first user, wherein a token is associated with one or more identifiers characterizing one or more communication item accompanying the token, means for encrypting the one or more tokens to create respective one or more encrypted tokens, and means for providing the one or more encrypted tokens to one or more second users for subsequent use in communication to the first user to enable the first user to screen incoming communication items.

According to another example embodiment, another apparatus is provided, the apparatus comprising means for receiving an indication of one or more incoming communication items addressed to a first user and an encrypted token associated with one or more identifiers characterizing the one or more communication items, means for decrypting the encrypted token to derive a decrypted token to enable verification of the token, and means for applying a predetermined rule to screen incoming communication items, wherein said predetermined rule determines handling of the one or more incoming communication items at least on basis of the outcome of the verification.

According to another example embodiment, a method is provided, the method comprising obtaining one or more tokens for screening incoming communication items to a first user, wherein a token is associated with one or more identifiers characterizing one or more communication item accompanying the token, encrypting the one or more tokens to create respective one or more encrypted tokens, and providing the one or more encrypted tokens to one or more second users for subsequent use in communication to the first user to enable the first user to screen incoming communication items.

According to another example embodiment, another method is provided, the method comprising receiving an indication of one or more incoming communication items addressed to a first user and an encrypted token associated with one or more identifiers characterizing the one or more communication items, decrypting the encrypted token to derive a decrypted token to enable verification of the token, and applying a predetermined rule to screen incoming communication items, wherein said predetermined rule determines handling of the one or more incoming communication items at least on basis of the outcome of the verification.

According to another example embodiment, a computer program is provided, the computer program including one or more sequences of one or more instructions which, when executed by one or more processors, cause an apparatus at least to obtain one or more tokens for screening incoming communication items to a first user, wherein a token is associated with one or more identifiers characterizing one or more communication items accompanying the token, to encrypt the one or more tokens to create respective one or more encrypted tokens, and to provide the one or more encrypted tokens to one or more second users for subsequent use in communication to the first user to enable the first user to screen incoming communication items.

According to another example embodiment, another computer program is provided, the computer program including one or more sequences of one or more instructions which, when executed by one or more processors, cause an apparatus at least to receive an indication of one or more incoming communication items addressed to a first user and an encrypted token associated with one or more identifiers characterizing the one or more communication items, to decrypt the encrypted token to derive a decrypted token to enable verification of the token, and to apply a predetermined rule to screen incoming communication items, wherein said predetermined rule determines handling of the one or more incoming communication items at least on basis of the outcome of the verification.

The computer programs referred to above may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to the fifth aspect of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings.

FIG. 4 illustrates exemplifying combinations of identifiers in accordance with an example embodiment.

FIG. 5 illustrates exemplifying combinations of identifiers in accordance with an example embodiment.

FIG. 6 schematically illustrates obtaining a token in accordance with an example embodiment.

DESCRIPTION OF SOME EMBODIMENTS

Figures 1, 2, 3:
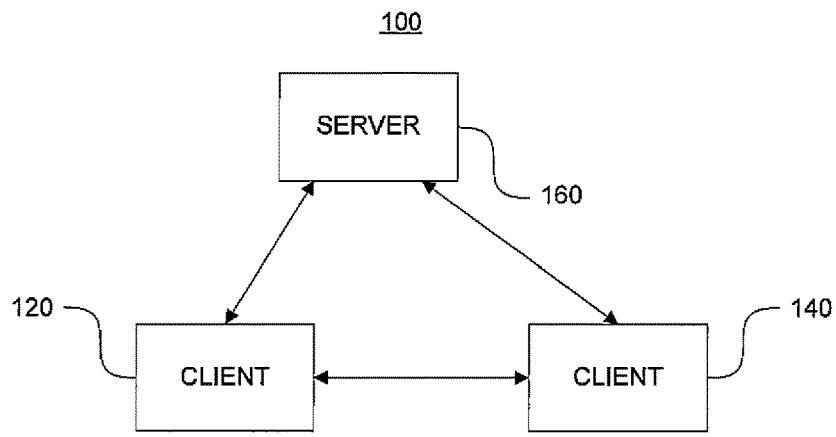
FIG. 1 schematically illustrates an exemplifying arrangement.
FIG. 2 illustrates exemplifying identifiers in accordance with an example embodiment.
FIG. 3 illustrates exemplifying combinations of identifiers in accordance with an example embodiment.

FIG. 1 schematically illustrates an exemplifying arrangement 100 comprising a first client 120, a second client 140 and a server 160. The first client 120 is able to communicate with the second client 140 via a wireless and/or a wired network by transmitting and/or receiving data and signaling information. The first client 120 and the second client may be able to communicate, for example, via a cellular mobile network by using respective cellular protocols, such as GSM, UMTS, LTE, CDMA, CDMA2000, etc. As another example, additionally or alternatively, the first client 120 may be able to communicate with the second client 140 via a packet switched network, such as a local area network (LAN), a wireless local area network (WLAN), the Internet, etc. As a further example, additionally or alternatively, the first client 120 and the second client 140 may be able to communicate over a link of other type, e.g. by using Bluetooth (BT) technology near field communication (NFC) technology or by using any other suitable communication means known in the art. The first and the second clients 120, 140 are preferably also able to communicate with the server 160 via a wireless and/or a wired network, for example via one of the type(s) described hereinbefore.

The network connecting the first client 120, the second client 140 and the server 160 typically comprises a number of intermediate components, elements and/or apparatuses. Moreover, the first client 120 and the second client 140 may be configured or enabled to communicate over two or more networks of different type, either sequentially or concurrently. However, the details of the network are not described herein since the network architecture or the role and operation of possible intermediate network components/elements/apparatuses does not play a significant role in the general operation of embodiments of the present invention.

The example arrangement 100 provides a logical framework, components of which, i.e. the first client 120, the second client 140 and the server 160, may be embodied using one or more apparatuses. In particular, each of the components may be embodied by one or more apparatuses or as part of one or more apparatuses. However, typically, each client 120, 140 is embodied as a single apparatus or as a portion of a single apparatus. In one embodiment, a client 120, 140 may be embodied as a mobile device or as a portion thereof, wherein the mobile device is a mobile phone, a smartphone, a gaming device, a personal assistant, a music player, an internet tablet, a laptop computer. Generally, a client 120, 140 may be embodied as an apparatus or as a portion thereof capable of making and/receiving calls, such as circuit switched calls (e.g. over a landline connection or a cellular connection) and/or packet-switched calls (e.g. Voice over IP carried by a wired or a wireless communication link). Moreover, alternatively or additionally, a client 120, 140 may be embodied as an apparatus or as a portion thereof capable of sending and/or receiving messages in accordance with a messaging system, such as SMS, email, instant messaging, etc.

In one example embodiment, the server 160 may be embodied as a single server apparatus, as one or more portions of a server apparatus, as a plurality of server apparatuses or as one or more portions of one or more server apparatuses. Each/any of the clients 120, 140 and the server 160 may be embodied in an apparatus by software means, by hardware means, or by a combination of software means and hardware means. In particular, for some example embodiments a client 120, 140 may be embodied as an user account, such as an email account or an account of an instant messaging system, or a subscriber module, such a SIM card of a GSM system, which can be addressed independently of the hardware employed to operate the user account or the subscriber module.

In the exemplifying arrangement 100, in many occasions it may be beneficial to provide a receiver of a communication item with additional information regarding the incoming communication item and/or the originator or sender thereof in order to, for example, enable screening of the incoming communication items in a desired manner and/or to enable providing the user of the client 120, 140 with additional information about the incoming communication and/or the origin or originator thereof.

In this regard, some example embodiments of the present invention make use of an identification token, referred to herein as a token in short, that may be used to provide information regarding the type of an incoming communication item and/or the origin of the incoming communication item. As referred to hereinbefore, the terms communication and communication item are to be interpreted broadly, encompassing an incoming circuit-switched or packet-switched call where the call may be a video call or an audio(-only) call, an incoming email message, an incoming SMS message, an incoming message of an instant messaging service etc. The token is provided to the receiver of the communication item in parallel with the communication item. As an example, the token may be embedded in the same message or signal that is carrying the communication item or a portion thereof, thereby implicitly associating the token with the communication item. Such an approach conveniently carries the token together with the communication item and thereby dispenses the need for explicit linkage between the token and the communication item. As another example, the token may be provided to the receiver of the communication item separately from the message(s) or signal(s) carrying the communication item and the association between the token and the communication item is provided explicitly, for example by providing the token in a message or signal including also an identifier linking the token to the communication item. While such an approach may involve slightly higher complexity than the previous example, a benefit of providing the token separately from the token is that it enables using the token with legacy systems that are not designed or otherwise provisioned to carry the token in message(s) or signal(s) thereof. A variation of this example associates the token with the communication item the another way around by including in a message or a signal carrying the communication item an identifier that linking the communication item with a given token.

Such a token may be employed at the client 120 receiving the communication item accompanied by a token by setting predetermined rule(s) for handling incoming communication items in a predetermined manner e.g. on basis of their type and possibly further on basis of the current usage scenario, time of the day, day of the week, etc. in dependence of one or more type identifiers included in the token. Moreover, the token may employed, additionally or alternatively, by setting the predetermined rule(s) for handling incoming communication items in a predetermined manner e.g. on basis of their origin. The origin may be handled in view of a source identifier and, especially, in view of similarity or dissimilarity between the source identifier and the designated owner(s) or assignee(s) of the token. In this context the source identifier refers to an identifier indicative of the origin of the incoming communication item, such as the telephone number of the caller in case of a circuit-switched call, the telephone number of the sender of an SMS, the user account name of an incoming packet-switched call or an instant message, the email address of the sender of an email message etc.

A token may be personal in that it is valid for incoming communication for a certain user or client for other clients to use. In other words, a token may be generated and/or provided by the first client 120 to the second client 140 for subsequent communication attempts by the user of the second client 140 to the user of the first client 120 and hence the token may be assigned to the second client 140 or the user thereof. Moreover, as will be described in more detail hereinafter, instead of assigning a token to a single client only, the token may be assigned to a number of second clients 140 for use in subsequent communication attempts to the first client 120. To keep the terminology regarding the designators 'first' and 'second' consistent, in the following it is assumed that the term 'first user' refers to the user of the first client 120 and hence the assignor of a token, whereas the term 'second user' refers to the user of the second client 140 or a further client and hence to the assignee(s) of the token.

In accordance with an example embodiment, a token may be associated with at least one type identifier indicative of the type of the incoming communication item accompanied by the token. A type identifier may be indicative of the urgency level or priority level of the incoming communication item. As an example, a type indicator simply assigning urgency—as opposed to 'normal' priority communication—may be employed, as indicated in an example in FIG. 2a. As another example, a type indicator indicative of urgency level or priority may be one of two more type indicators, each indicating a different level of urgency. An example in this regard is illustrated in FIG. 2b, showing an example of type identifiers for three different priority levels.

Another exemplifying class of type indicators provides one or more type indicators that are indicative of the context of the communication item accompanied by the token. Examples in this regard include a type identifier indicative of a "business matter", a type identifier indicative of a "family matter", a type identifier indicative of a "friend", a "social call" or a "leisure matter", a type identifier indicative of a matter associated with a predetermined group of users or clients, such as group of colleagues at the office or a group of users belonging to a hobby club, a type identifier indicative of a "(tele)marketing matter", etc. A type identifier indicative of the context of communication hence serves to indicate the relationship between the assignor and the assignee(s) of the token. Consequently, the token associated with a type identifier of such kind may be employed to categorize the reason for addressing the communication item to a client 120, 140 and hence enable the client 120, 140 or the user thereof to handle the incoming communication item in an appropriate manner in consideration of the circumstances. FIG. 2c provides an example in this regard with three different type indicators.

According to example embodiments there may be further classes or kinds of type identifiers in addition to the two example classes provided hereinbefore. The different classes or kinds of the type identifiers may be associated with the same token if found useful in order to provide further granularity of type indication of a communication item. As an example, a token may be associated with type identifiers indicating (a high level of) urgency and a "business matter", as schematically illustrated by an example of FIG. 3a, typically rendering a communication item accompanied by such a token of particular importance during business hours. As another example, as schematically illustrated by an example of FIG. 3b, a token may be associated with type identifiers indicating a low level of urgency and a "friend", thereby in many cases assigning a communication item accompanied by such a token as one with low interest during business hours while, on the other hand, outside business hours or during holidays such a token may be considered to indicate a communication item of relatively high importance.

In accordance with an example embodiment, a token may be associated with at least one user identifier indicative of the owner or assignee of the token. Instead of one or more user identifiers of a sole owner or assignee of a token, the token may be associated with at least one user identifier of one or more owner or assignees. In other words, a token assigned by a first user may be further owned by or assigned to one or more second users and the token may hence be associated with one or more user identifiers of one or more second users. A user identifier may be comprise, for example, the name of a respective second user, a mailing address of the respective second user, an email address of the respective second user, a username to a predetermined service or system of the respective second user, a telephone number of the respective second user, etc. In this regard, FIG. 4a schematically illustrates an example of user identifiers of a token assigned to a single second user, comprising the name, an email address and a telephone number of the single user. Along similar lines, FIG. 4b schematically illustrates an example of user identifiers of a token assigned to three users, comprising the names and telephone numbers of each of the three assignees.

Inclusion of the user identifier(s) of the assignee(s) in a token enables increasing the trust level of communication accompanied by such a token. As an example in this regard, a token associated with a user identifier may be employed to verify that the originator of a communication item accompanied by such a token is the same as the one indicated by the source identifier associated with the communication item. On the other hand, as another example, a token associated with a user identifier may be employed to detect a misuse of the token by detecting a user identifier of the token that does not match with the source identifier.

While association of one or more user identifiers with a token serves to enable active screening and detection of the misuse of the token by somebody else than one of the one or more assignees, also a token provided without any user identifiers inherently provide some level of trust since it is unlikely that any token would end up in the hands of a malicious third parties and it may be reasonable to expect to a certain extent that any party using a token is likely have obtained the token from one of the original assignees and is hence a user to be trusted (by the assignor of the token) due to being a trusted person of an assignee.

A single token may be associated with one or more type identifiers and one or more user identifiers to enable versatile manner of providing additional information regarding the type or origin of the accompanying communication item. Moreover, the classes of type identifier and the user identifier are provided as non-limiting examples only, and a token may be associated with one or more identifiers of different class or kind. FIG. 5a schematically illustrates an example of identifiers for a token assigned to a single second user combining type identifiers of different classes, i.e. priority identifier and a context identifier further combined with user identifiers of the single user. FIG. 5b schematically illustrates an example of identifiers for a token assigned to three second users combining a priority identifier and a context identifier together with a user identifier for the three second users.

According to an example embodiment, a token may be associated with one or more user identifiers of the first user, i.e. the assignor identification. Along the lines described in context of user identifiers for the one or more assignees, a user identifier of the assignor may comprise e.g. the name of the first user, a mailing address of the first user, an email address of the first user, a username to a predetermined service or system of the first user, a telephone number of the first user, etc. However, in many scenarios it is not necessary to explicitly associate the user identifier(s) indicating the first user with a token since the identity and hence the relevant user identification information is readily known from the context.

According to an example embodiment, the first client 120 may be configured to obtain a token associated with one or more identifies characterizing a communication item that the token will be, subsequently, used to accompany, as described hereinbefore. The identifiers associated with the token are selected e.g. according to intended use of the token and/or according to desired trust level of the token. Obtaining a token may comprise reading a pre-generated token of desired characteristics e.g. from a memory at the first client 120. As another example, obtaining a token may comprise the first client 120 generating the token on basis of the identifiers (to be) associated with the token. In such a scenario, the identifiers (to be) associated with the token may be obtained e.g. by user input via an user interface of the first client 120. As a further example, obtaining a token may comprise receiving the token from another client or entity, e.g. from a server that is configured to generate the token on behalf of the first client 120 in accordance with identifiers provided by the first client 120 or according to instructions from the first client 120 in accordance with identifiers pre-stored in the server.

In accordance with an example embodiment, a token may be provided as a plaintext string of characters thereby providing the identifiers of the token in a human-readable format. Such a token would explicitly comprise the identifiers instead of merely associating the token with the respective identifiers. However, such format of a token may not be practical in all scenarios, especially in case of long and/or multiple user identifiers and/or a high number of second users as assignees. As another example, possible values of one or more identifiers may be assigned a code or an index that represents the respective identifier in the token, such a token thereby directly comprising piece(s) of information explicitly representing each of the one or more identifiers. While such an approach enables expressing some identifiers, e.g. type identifiers indicating priority or context, in a compact manner thereby enabling making efficient use of storage/transmission capacity, such an approach requires at least some level of centralized control to ensure uniqueness of the codes or indexes, which is likely to limit the applicability of some identifier types, e.g. names and/or addresses applied in user identifiers—possibly to an extent making it unfeasible approach to represent user identifiers in a general case. However, e.g. in a centrally coordinated usage environment providing limited 'namespace' of applicable addresses and/or names such an approach would provide a well-working and efficient solution.

As a further example, a token may be provided as a Universally Unique Identifier (UUID) determined or derived on basis of the identifiers included in the token. The UUID is standardized by the open software foundation (OSF). The concept of the UUID is documented e.g. in International Telecommunication Union, Telecommunication Sector (ITU-T) Recommendation X.667 with the same documentation also provided under ISO/IEC 9834-8:2005, where ISO stands for International Organization for Standardization and IEC stands for the International Electrotechnical Commission. Moreover, (technically) equivalent specification can be found in the Internet Engineering Task Force (IETF) Request for Comments (RFC) 4122. A UUID is a 128-bit number, typically presented in its canonical form as five groups of hexadecimal numbers with the groups separated by hyphens, the first group consisting of eight characters, the second, third and fourth groups consisting of four characters with the fifth group consisting of twelve characters, the presentation hence comprising 32 hexadecimal numbers/characters and four hyphens, e.g. 8f817169-b97b49 a0-9ce9-f2448b162601.

A UUID serving as a token may be generated, for example, by composing a string of characters representing the identifiers of the token, e.g. by concatenating the identifiers into a predetermined order, and applying a hash function to generate the corresponding UUID of 32 hexadecimal numbers. FIG. 6 schematically illustrates an example of generating a token as an UUID based on a set of identifiers. As an example regarding the UUID based approach for generating a token, UUID Version 5 applies SHA-1 hashing. Instead of a UUID, a token may be provided according to any hash function or mapping function that enables mapping a string of any length into a fixed-length value. In order to guarantee sufficient level of uniqueness, the hash function may comprise a cryptographic hash function. A benefit of basing a token on the UUID approach is that it enables generating tokens of practical uniqueness without centralized control. Another benefit of the UUID based approach is that the resulting tokens have fixed length regardless of the length of the string of characters used as basis for generating the UUID, thereby facilitating efficient storage and transport of tokens. On the other hand, it may not be possible to extract the identifiers used as basis for generating the token directly from the token, and hence it may be necessary to explicitly associate the identifiers with the token. As an example, such an explicit identification may be provided, e.g. in a memory of the first client 120, as a table or a database storing the token and the identifiers the token is associated with. Such a table or database may be employed to store new tokens together with the associated identifiers and/or to search for a token and the identifiers associated therewith upon receiving a token.

In accordance with an example embodiment, the first client 120 may be configured to encrypt a token in order to increase the trust level of the token. Any suitable encryption method known in the art may be employed. As a non-limiting example, e.g. the Advanced Encryption Standard (AES) may be employed. The encryption may be based on an encryption key. The encryption key applied in the encryption process may be determined by the first user, i.e. the user of the assigning client. This enables determination of an encryption key of the choosing. As another example, the encryption key may be automatically—e.g. randomly—selected by the first client 120, i.e. the assigning client. Consequently, the first client 120 may store the encrypted token and the respective encryption key, e.g. together with the (unencrypted) token and the associated identifiers in the table or database as described hereinbefore, to enable detection of a token when received together with an incoming communication item and decryption thereof to enable inspection and/or extraction identifiers included in the token. Optionally, the first client 120 may be configured to provide the encryption key to the one or more second clients 140. The provision of the encryption key to the second client(s) serves to provide an additional means of identification of a given second client 140. Details of this aspect are discussed in detail hereinafter.

As a further example, a sole assignee or one of a number of assignees may provide the encryption key to the first client 120 and the first client 120 may be configured to encrypt the token using the received encryption key. As described in the example hereinbefore, the first client 120 preferably stores the encrypted token and the respective encryption key for subsequent use upon receiving an incoming communication item accompanied by the respective (encrypted) token. As in case of the first client 120, i.e. the assigning client, determining the encryption key, the encryption key received from (one of the) second client(s) 140 may be a user-defined encryption key or automatically, e.g. randomly, selected encryption key.

Figure 7:
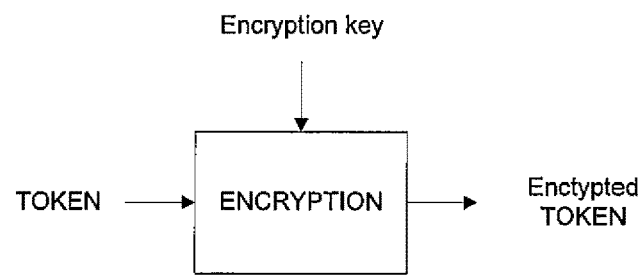
FIG. 7 schematically illustrates encrypting a token in accordance with an example embodiment.

FIG. 7 schematically illustrates the concept of encrypting a token. The token subjected to the encryption may be e.g. a token generated using the UUID approach described hereinbefore or by some other means.

In accordance with an example embodiment, the first client 120 may be configured to provide the token to one or more second clients 140 to be used in subsequent communication addressed to the first client 120, hence enabling the first 120 to screen and handle incoming communication on basis of the token. In case encryption of the token is employed, the token to be provided to the one or more second clients 140 is the encrypted token.

According to an example embodiment, the first client 120 is configured to provide the token to one or more second clients 140 together with information indicative of an association between the token and the first client 120 and/or with information indicative of an association between the token and the respective identifiers. As another example, in case the association between the token and the first client 120 and/or the association between the token and the respective identifiers are directly derivable from the token or they are otherwise known or derivable from the context, explicit information indicative of association between the token and the first client 120 and/or a user of the first client 120 may or may not be provided to the one or more second clients 140 together with the token. The information indicative of association between the token and the first client 120 may comprise, for example, the name or other user of the first client 120 or another identifier of the first client 120. The information indicative of the association between the token and the identifiers included therein may be the identifiers themselves.

In the foregoing, provision of a single token was discussed. However, the first client 120 may be configured to provide one or more tokens to one or more second clients 140, thereby providing the second clients 140 with tokens associated with different identifiers for different communication purposes. Depending on the delivery mechanism applied for providing the tokens to the one or more second clients 140, the one or more tokens may be provided concurrently or essentially concurrently, e.g. in the same message or signal or in separate messages or signals of the same signaling exchange. Alternatively, the one or more tokens may be provided concurrently or essentially concurrently in parallel signaling exchanges.

The first client 120 may be configured to provide one or more tokens to the one or more second clients 140 by any suitable transmission means. One example approach, however, comprises providing the one or more tokens as part of a vCard or xCard exchange, e.g. as one or more properties or parameters of a vCard or an xCard, as defined e.g. in RFC 6350 and RFC 6351, respectively. Note that RFC 6350 defines version 4.0 of the vCard standard, with the versions 2.1 and 3.0 defined in RFC 2425 and RFC 2426, respectively. The information provided in the vCard or xCard exchange provides information of the client/user and hence serves as an explicit association between the assignor of the one or more tokens and the provided in the vCard or xCard exchange.

In one example embodiment, the one or more tokens may be provided by making use of a standard-defined property of the vCard or xCard standard for a purpose different from the one specified in the respective standard. While this provides sufficient interoperability with the clients 120, 140 that are configured to interpret such non-compliant use of a vCard or an xCard property in the same way, it does not ensure full interoperability with clients that are not configured to apply such use of the respective vCard or xCard property. Hence, according to an example embodiment, dedicated one or more properties or parameters of a vCard or xCard are provided to enable communication of the one or more tokens from the first client 120 to the one or more second clients 140. As an example, a property or parameter employed for carrying a token may be an additional standard property or parameter or an additional private extension identified with an "x-" prefix to distinguish it from the standard-defined properties or parameters of vCard or xCard.

In the following, an example of a vCard version 4.0 with a private extension for delivering three tokens as UUIDs is provided (adapted on basis of the Wikipedia entry to the vCard, as retrieved from http://en.wikipedia.org/wiki/Vcard on 4 Feb. 2013).

BEGIN:VCARD
VERSION:4.0
N:Doe;John;;;
FN:Doe John
ORG:Example Corp.
TITLE:Jack of all trades
PHOTO:http://www.example.com/dir_photos/my_photo.gif
TEL;TYPE="work,voice";VALUE=uri:tel:+1-111-555-1234
TEL;TYPE="home,voice";VALUE=uri:tel:+1-404-555-3456
ADR;TYPE=work;LABEL="42 Any St.\nAnytown, LA -continued 30314\nUnited States of America"
 :;;42 Any St.;Anytown;LA;30314;United States of America
EMAIL:john.doe@example.com
REV:20080424T195243Z
X-TOKEN;TYPE=PRIORITY;SUB-TYPE=URGENT;OWNER=Jane Doe;VALUE=8f817169-b97b-49a0-9ce9-f2448b162601
X-TOKEN;TYPE=CONTEXT;SUB-TYPE=COLLEAGUE;VALUE=79054025-255f-b1a2-6e4b-c422aef54eb4
X-TOKEN;TYPE=CONTEXT;SUB-TYPE=FRIEND;OWNER=Mike Smith;VALUE=23423599-3209-7870-9908-723892333242
END:VCARD In the example above, the property "X-TOKEN" exemplifies the usage of the private extension in the framework of the vCard version 4.0, with the other properties being used in accordance with RFC 6350. The value of the each of the "X-TOKEN" properties may be provided as a base64 encoded string of characters, as specified for example in RFC 4648, in order to facilitate information transfer across various types of networks. However, representation different from base64 encoding may be employed without departing from the scope of present invention.

Figure 8:
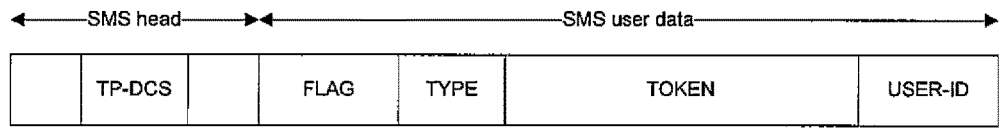
FIG. 8 schematically illustrates a specially formatted SMS message in accordance with an example embodiment.

As another example, the one or more tokens may be provided in one or more SMS message or in one or more MMS messages. As an example in this regard, a specially formatted SMS message may be employed to provide a single token to a second client 140, as schematically illustrated in FIG. 8. The exemplifying specially formatted SMS message illustrated in FIG. 8 is divided in the SMS header portion and the SMS user data portion. The SMS header portion comprises the TP-DCS field indicating the applied SMS data coding scheme (DCS), as specified e.g. in 3$^{rd}$ Generation Partnership Project (3GPP) technical specification (TS) 23.040. The value of the TP-DCS field is preferably set to 0x04. The SMS user data portion comprises at least the TOKEN field for carrying the token, formatted for example as a UUID as described hereinbefore. The SMS user data portion may comprise further fields further characterizing the token and/or associating the token with one or more identifiers, as illustrated in FIG. 8. Namely, the SMS user data portion may optionally comprise for example one of the following: a FLAG field that may be employed e.g. to carry a transmission identifier, one or more TYPE fields field that may be employed to specify the type identifier of the token, one or more USER ID fields that may be employed to carry a user identifier of the assignee of the token.

While the above example describes provision of a single token in a SMS message, it readily extends into a format that is able to carry two or more tokens by repeating e.g. the fields exemplified in FIG. 8 for each of the tokens carried therein. Moreover, as another extension to the example of FIG. 8, e.g. a MMS message carrying corresponding information may be employed. As a further example, a special format SMS message or MMS message of different format may be employed to carry one or more tokens.

As a further example, the first client 120 may be configured to provide the one or more tokens to one or more second clients 140, using appropriate, possibly proprietary, communication protocol, by email, by BT exchange, using NFC technology or by using any other suitable communication means known in the art. In another example embodiment, whether employing vCard or xCard exchange, specially formatted SMS message or another means for providing the one or more tokens to the one or more second clients 140, the first client 120 may be configured to push the data comprising the one or more tokens to the one or more second clients 140 by making use of an appropriate push protocol or a protocol that enables pushing information from the first client 120 to a second client 140.

According to an example embodiment, instead of providing the one more tokens directly to one or more second clients 140, the first client 120 may be configured to upload the one or more tokens to a server, e.g. the server 160, for subsequent downloading and use by the one or more second clients 140. The one or more tokens may be stored in the server in a table or in a database arranged to store tokens, possibly together with the one or more identifiers associated therewith, from one or more first users for the other users having access to the server to download. Such a distribution mechanism may be suitable for example within a company network for provision of tokens with colleagues or one or more certain groups of colleagues as assignees of the token(s).

According to an example embodiment, the first client 120 may be configured to receive, upon receiving an indication of an incoming communication item addressed to the first client 120, a token accompanying the incoming communication item. As described by various examples hereinbefore, the token is associated with one or more identifiers, e.g. one or more type identifiers and/or one or more user identifiers of one or more second users, characterizing the communication item.

The token may be received, for example, in one or more messages accompanying the incoming communication item, which one or more messages are dedicated for carrying one or more tokens and/or other information associated with the communication item. An example in this regard, e.g. a User-to-User Signaling (UUS) protocol as specified e.g. in "GSM 02.87: GSM Digital Cellular Telecommunication System (Phase 2+); User-to-User Signaling (UUS); Service Description, Stage 1, V. 5.2.1" published by the European Telecommunications Standards Institute (ETSI) in November 1997 or a corresponding protocol may be employed to provide a token with an incoming communication item.

As another example, the token may be received in the same message(s) with the incoming communication item. As an example in this regard, a token may be carried in an extension field of a message according to a communication protocol. As another example, a token may be carried in a reserved data field—e.g. in a data field explicitly reserved for user data—of a message according to a communication protocol. Such data fields are provided in a number of call set-up signaling protocols and/or communication protocols known in the art. As a further example in this regard, a token may be received in an attachment in an MMS message or in an email message. Such an attachment may be provided with a proprietary flag or identifier of another type included in a header part of the attachment while the body of the attachment carries the token, for example along the lines schematically illustrated in FIG. 9.

According to an example embodiment, the token may be encrypted and the first client 120 may be configured decrypt the received token to derive a decrypted token to enable verification of the token. The encryption of the token may have been carried out on basis of an encryption key and, consequently, the decryption may be based on the same encryption key. The first client 120 may be further configured to verify the decrypted token e.g. by comparing it to the original unencrypted token: the verification is successful if the decrypted token matches the original unencrypted token, e.g. is equal to the original unencrypted token. In contrast, the verification is unsuccessful if the decrypted token does not match the original unencrypted token, e.g. is not equal to the original unencrypted token. The original unencrypted token and the identifiers associated therewith may be obtained for verification e.g. in a table or a database stored in a memory of the first client 120, as described hereinbefore in context of obtaining a token.

According to an example embodiment, the first client 120 may be configured to apply a predetermined rule to handle or process, e.g. screen, incoming communication items in accordance with a predetermined screening rule. The screening rule determines handling of incoming communication items at least on basis of outcome of the verification of the token. The screening rule may further determine the handling of incoming communication items on basis of one or more identifiers associated with the token, as described in more detail by examples hereinafter.

As an example, the screening rule may involve blocking the incoming communication item in response to unsuccessful verification of the accompanying token. As another example, unsuccessful verification of the accompanying token may result in provision of a message or an indication of other type for display in a user interface of the first client 120, the message/indication indicating that the incoming communication item has been received with an invalid or unrecognized token. In contrast, according to a further example, successful verification of the token may result in provision of a message or an indication of other type for display in the user interface of the first client 120, the message/indication confirming that the respective incoming communication item was received with a valid token, the message/indication possibly further comprising indication of one or more identifiers associated with the received token.

According to an example embodiment, one or more identifiers associated with a received, and possible decrypted, token may be extracted or otherwise determined. As described hereinbefore, a token may be provided in a format where the one or more identifiers associated with the token are readable from the token and, consequently, the client 120 may be configured to read and/or extract the one or more identifiers from the received token. As described hereinbefore as another example, it may not be possible to read and/or extract the identifiers associated with the token. In such a scenario the client 120 may be configured to access a table or a database stored in a memory of the client 120 to search for the received token and to read or extract the one or more identifiers associated with the received token from the table/database upon finding an entry of the table/database corresponding to the received token.

According to an example embodiment, the token may be associated with one or more type identifiers indicative of the type of the accompanying communication item and the screening rule determines handling of incoming communication items further on basis of the type identifier(s). The screening rule may be, for example, configured to provide a message or an indication of other type for display on a user interface of the first client 120 in response to successful verification of the respective token, the message/indication providing the user of the first client 120 with an indication of the type of the incoming communication item in accordance with the one or more type identifiers included in the token.

Alternatively or additionally, the screening rule may be further configured to e.g. block communication items accompanied by a token associated with a type identifier indicating urgency level below a predetermined threshold level and to let through communication items received with a token associated with a type identifier indicating urgency level at or above the predetermined threshold level. As another example in this regard, the screening rule may be configured to block communication items of certain type while letting through communication items of other type in dependence of the time of the day and or day of the week: the screening rule may block communication items accompanied by a token comprising a type identifier indicating "business matter" outside business hours and/or during weekends and/or block communication items received with a token comprising a type identifier indicating a "social call" or "leisure matter" during business hours on weekdays.

According to an example embodiment, the indication of an incoming communication comprises a source identifier indicative of the origin of the communication item, such as the telephone number of the caller in case of a circuit-switched call, the telephone number of the sender of an SMS, the user account name of an incoming packet-switched call or an instant message, the email address of the sender of an email message etc. as described hereinbefore. If, in such a scenario, a token is associated with one or more user identifiers of one or more second users that assign the token to said one or more second users, the screening rule may further determine handling of incoming communication items on basis of said source identifier and said one or more user identifiers.

As an example in this regard, possibly in response to successful decryption of the token, the screening rule may involve comparing the source identifier with the one or more received user identifiers associated with the token and blocking the respective communication item in response to none of the user identifiers associated with the token providing a match with, e.g. being equal to, the source identifier. The comparison may not necessary directly compare the source identifier with the user identifiers associated with the token but the first client 120 may be configured to access a database in a memory of the first client 120, e.g. a phone book or contact list of other type, to find further source identifiers associated with the source identifier comprised in the indication of the incoming communication item and use one or more of the source identifiers found in the database for comparison.

As another example in this regard, the screening rule may comprise, possibly in response to successful decryption of the token, providing a message or an indication of other type for display on a user interface of the first client 120 in response to comparison of the source identifier with the one or more user identifiers associated with the received token indicating a match, the message/indication providing the user of the first client 120 with an indication of successful originator verification on basis of the token, possible together with the identity of the user whose user identifier provided the match. In contrast, the screening rule may comprise, possibly in response to successful decryption of the token, providing a message or an indication of other type for display on a user interface of the first client 120 in response to comparison of the source identifier with the one or more user identifiers associated with the received token failing to provide a match, the message/indication providing the user of the first client 120 with an indication of unsuccessful originator verification on basis of the token.

As described hereinbefore, a token encrypted on basis of an encryption key typically require access to the same encryption key to enable successful decryption of the token. The encryption key may be locally available, e.g. stored in a table or a database together with the respective token in a memory of the first client 120, as described hereinbefore. In accordance to an example embodiment, the client 120 may be configured to receive the encryption key or a copy thereof together with the encrypted token. This serves to facilitate verification of the origin of the token: in case a valid encryption key is received at the first client 120 together with a token accompanying the incoming communication item, it serves as an indication that the originator of the incoming message has access to the encryption key, thereby making it highly likely that the originator is either the second user or the originator is a party trusted by the second user to extent that he/she has been given the encryption key, in other words a legitimate user of the respective token.

An exemplifying scenario where the encryption key received at the first client 120 together with the token serves as proof of the trusted origin of the accompanying communication item is a case where the second user has sent the communication item from a source address different from one(s) indicated the respective user identifiers of the token, e.g. from a new or alternative email address or from a new telephone subscription having a new telephone number.

While the description hereinbefore (and hereinafter), for clarity and brevity of description, describes an example of a token accompanying a single communication item, a token may accompany and hence be valid for one or more communication items. Two or more communication items having a single token associated therewith are typically received from the same source at the same time, essentially at the same, or within a relatively short period of time. The communication items having a single token associated therewith may be communication items of similar type, e.g. two email messages or two SMS messages. Alternatively, the communication items having a single token associated therewith may be communication items of different type, e.g. an incoming call and a SMS message.

Figure 9:
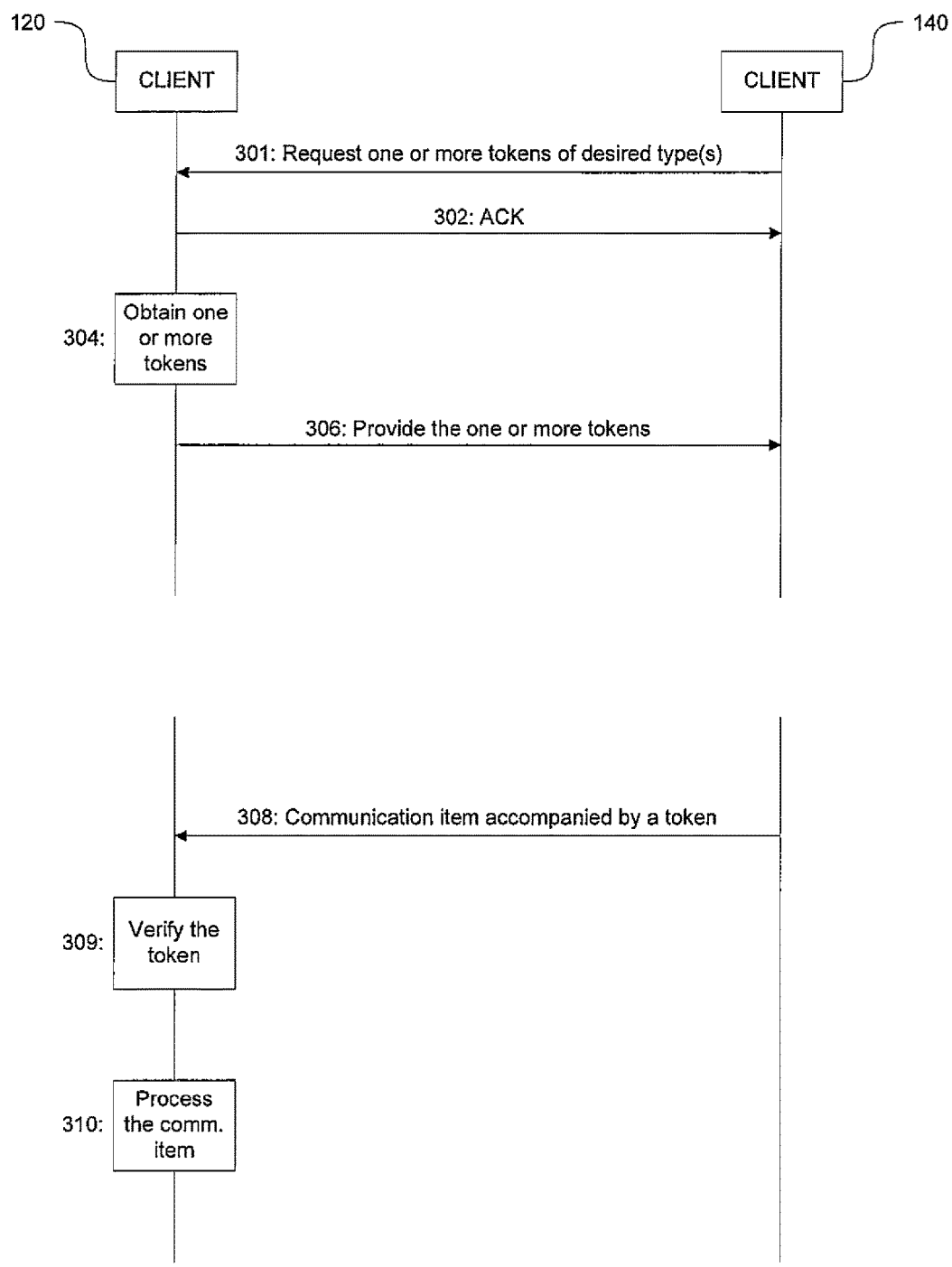
FIG. 9 illustrates a signaling chart in accordance with an example embodiment.

A signaling chart illustrated in FIG. 9 provides an example of a process for the first client 120 providing the second client 140 with a token and the second client 140, subsequently, using the token to accompany a communication item addressed to the first client 120. In this example, in step 301 the second client 140 requests one or more tokens of desired type(s) from the first client 120, for which the first client 120 responds with an acknowledgement indicating that it will assign the one or more of the requested one or more tokens to the second client 140. The request and the subsequent acknowledgment may be exchanged according to communication protocol and/or communication exchange specifically tailored to request one or more tokens, e.g. by email, by BT exchange, by SMS, using NFC technology or by using any other suitable communication means known in the art.

However, such a request is optional in that the first client 120 may be equally well initiate provision of the one or more tokens to the second client 140 on its own without an explicit request thereto. In practice it is also possible for the user of the second client 140 to other means to request the one or more tokens from the user of the first client 120, e.g. by sending an informal request to acquire one or more tokens of desired type(s) e.g. by email, by SMS, etc. or even by a verbal request. Moreover, regardless of the manner of receiving the request to provide the one or more tokens to the second client 140, the acknowledgement of step 302 may be omitted and the process may move on to the subsequent steps without providing an explicit acknowledgement.

In step 304 of the example of FIG. 9, the first client 120 obtains the one or more tokens, and in step 306 the first client 120 provides the one or more tokens to the second client 140. Examples regarding obtaining the token(s) and providing them to the second client 140 are described hereinbefore. Once obtained, the first client 120 may be configured to store the one or more tokens in a memory of the first client 120, e.g. in a database of other type in order to enable keeping track of the one or more tokens and the identifiers associated therewith. As an example, in case the identifiers associated with the token comprise user identifier(s) of one or more second users, the respective token(s) may be stored as additional entries to a phonebook or a contact list stored in a memory of the first client 120 or the phonebook/contact list may be provided with a pointer to a dedicated table or database in a memory of the first client 120 storing the tokens and identifiers included therein to enable subsequent matching with a received token and associated identifiers.

The first client 120 may be configured to generate and provide only some of the one or more tokens requested by the second client 140 or the user thereof. Such a restriction to refrain from providing all requested tokens to the second client 140 may be based on explicit decision or selection by the user of the first client 120 or to a predefined policy applied in the first client 120.

Figure 13:
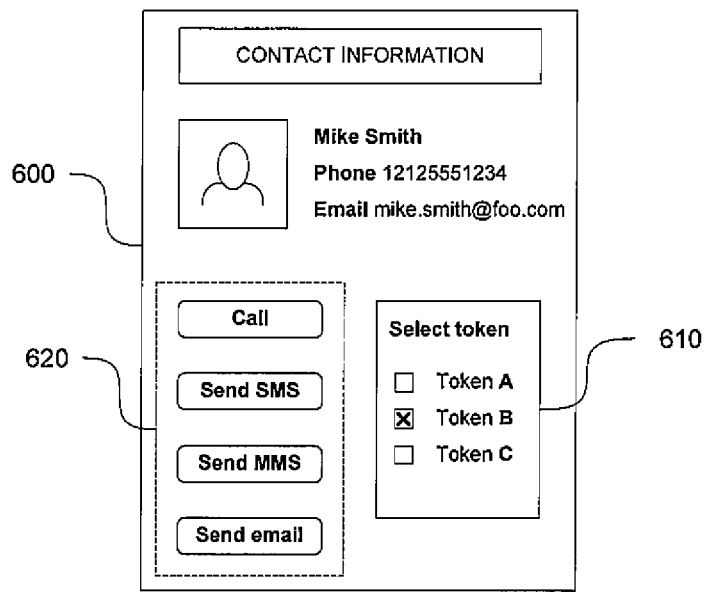
FIG. 13 schematically illustrates an exemplifying user interface in accordance with an example embodiment.
Figure 14:
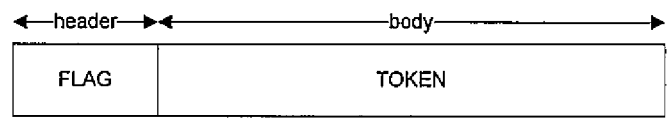
FIG. 14 schematically illustrates a structure of an exemplifying attachment for carrying a token in accordance with an example embodiment.

Once having the one or more tokens in its disposal, the second client 140 may choose to an appropriate token of the one or more tokens to accompany a communication item to be provided to the first client 120, as indicated in step 308 of the example of FIG. 9. In this regard, the user interface of the second client 140 is provided with suitable mechanism(s) that enable the user of the second client 140 to provide a communication item, e.g. a telephone call, an SMS, an MMS, an email message, as described hereinbefore, with a token of his/her choosing. As a non-limiting example in this regard, FIG. 13 schematically illustrates a window or a screen 600 that may be applied to select one of the tokens provided in the portion 610 of the window/screen 600 by ticking the respective box e.g. before selecting and proceeding with initiating one of the communication options 620.

In step 309 the first client 120 processes the token received together with the communication item to verify the token and/or identifiers associated therewith and in step 310 the first client applies the screening rule to handle or process the incoming communication item in accordance with the identifiers associated with the received token, as described in more detail hereinbefore.

Figure 10:
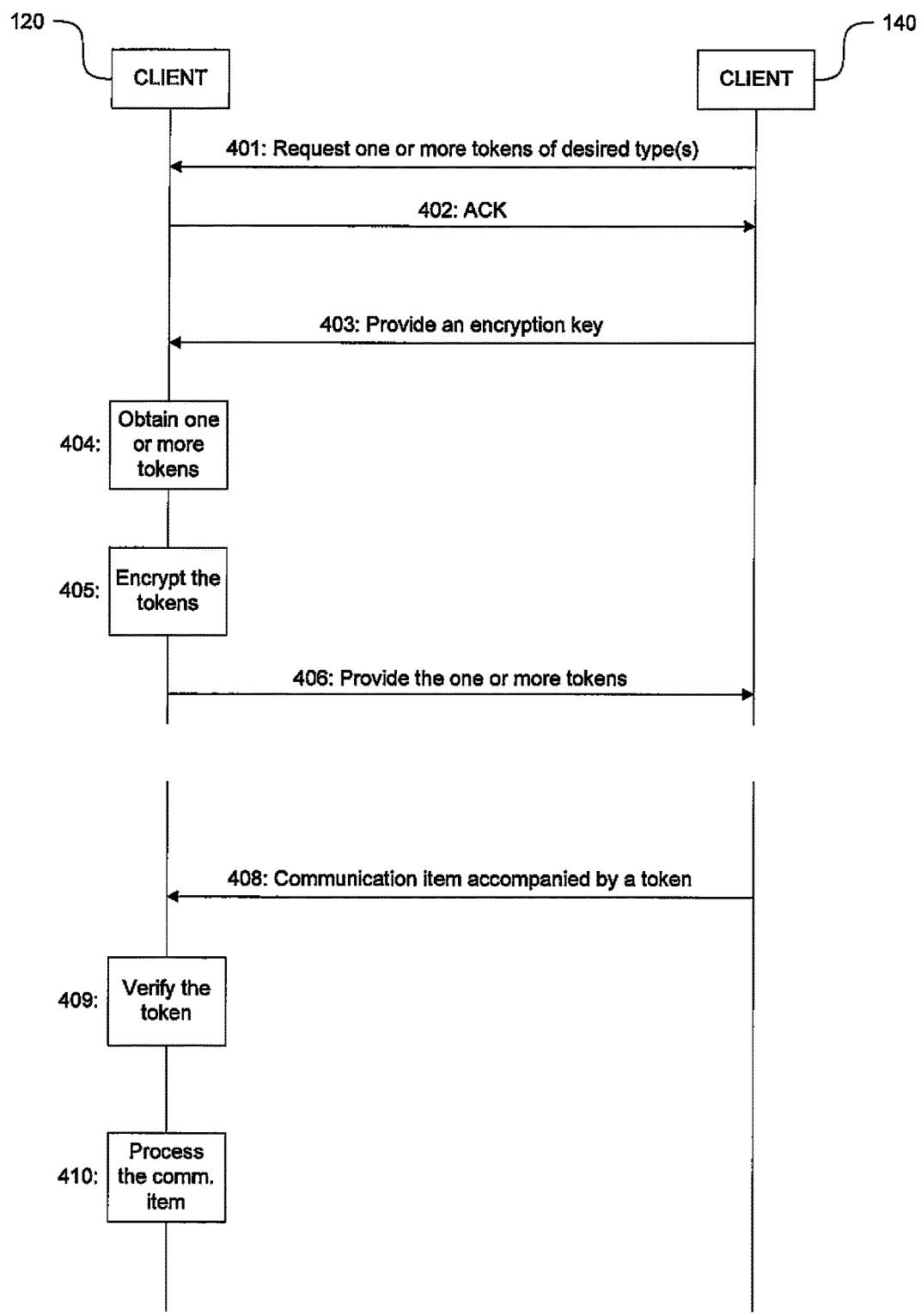
FIG. 10 illustrates a signaling chart in accordance with an example embodiment.

A signaling chart illustrated in FIG. 10 provides a second example of a process for the first client 120 providing the second client 140 with a token and the second client 140, subsequently, using the token to accompany a communication item addressed to the first client 120. The steps 401 and 402 of the second example are similar to steps 301 and 302, respectively, described in context of the (first) example of FIG. 9.

In optional step 403 of the second example of FIG. 10 the second client 140 provides the first client 120 with an encryption key for subsequent encryption of the one or more tokens. As described hereinbefore, instead of receiving the encryption key from the second client 140, the first client 120 may generate the encryption key locally or obtain the encryption key from another source.

In step 404 of the second example the one or more tokens are obtained and the token(s) are possibly stored in a memory of the first client, as described in context of step 304 of the (first) example of FIG. 9. In step 405 the one or more tokens are encrypted and the resulting one or more encrypted tokens may be also stored in a memory of the first client together with their original unencrypted counterparts for subsequent verification purposes. In step 406 the one or more encrypted tokens are provided to one or more second clients 140, in a manner similar to step 306 of the (first) example of FIG. 9 and described in more detailed examples hereinbefore.

Steps 408 to 410 of the second example correspond to steps 308 to 310 of the (first) example of FIG. 9, respectively. However, in the second example the verification of the token in step 409 may further comprise decryption the token and the screening rule applied in step 410 may further employ the result of the decryption process in handling of the incoming communication item, as described in more detailed examples hereinbefore.

Figure 11:
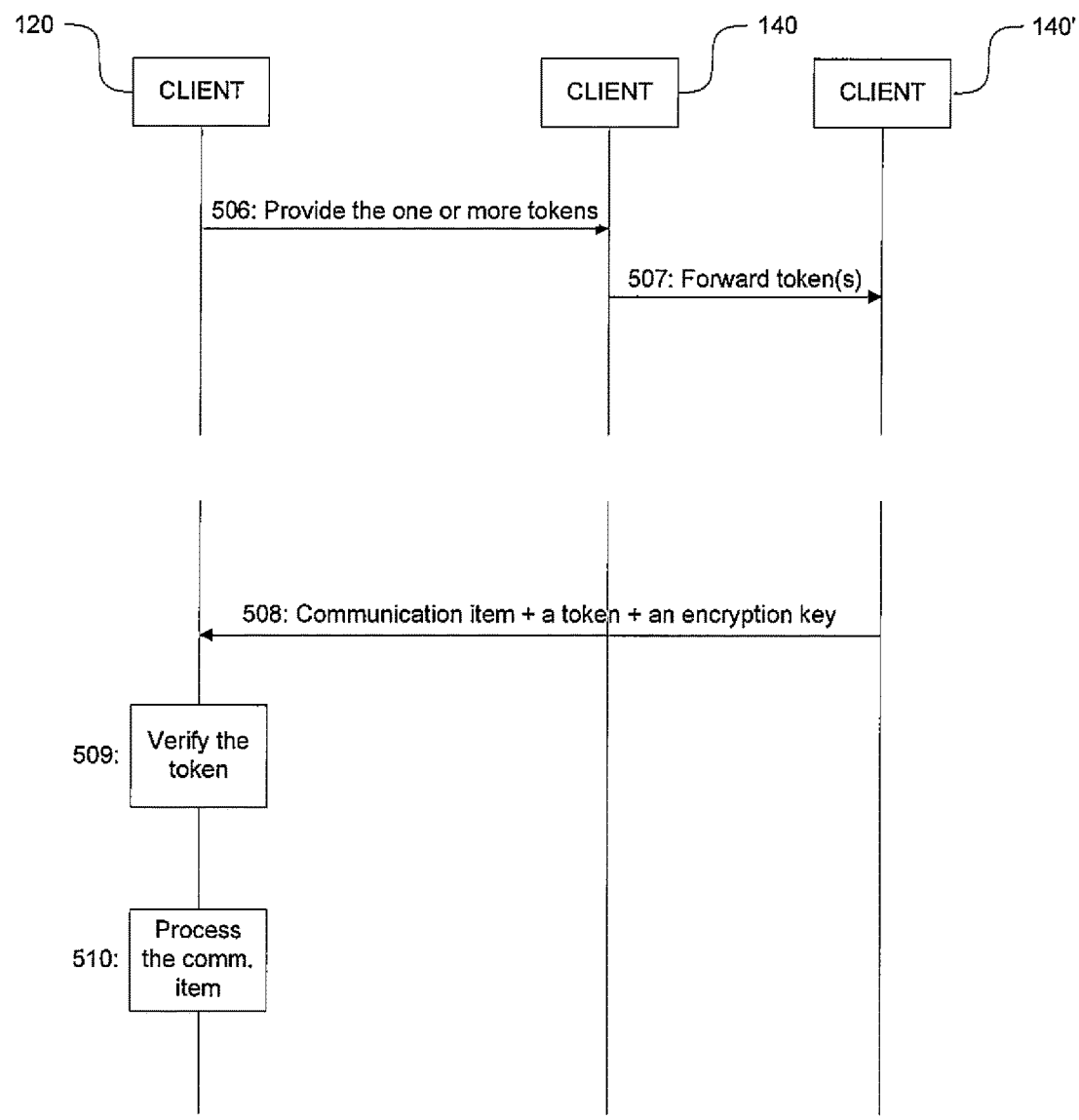
FIG. 11 illustrates a signaling chart in accordance with an example embodiment.

A signaling chart illustrated in FIG. 11 provides a third example of a process for the first client 120 and two second clients 140, 140' applying a token assigned to the user of the second client 140 used to accompany a communication item originating from a further second client 140'.

In the third example, it is assumed that a token encrypted with an encryption key provided to the first client 120 by the second client 140 or that the encryption key is otherwise provided to disposal of the second client 140. Such a token may be provided e.g. in accordance with the second example described in context of FIG. 10.

In step 506 of the third example, which corresponds to the step 406 of the second example, the second client 140 receives one or more encrypted tokens from the first client 120. In step 507 of the third example, the second client 140 forwards at least one of the encrypted tokens to the further second client 140', which may be another user account, another email address, another/new telephone number of the second user, i.e. the user of the second client 140.

In step 508 the further second client 140' addresses a communication item to the first client 120 accompanied by the encrypted token and the respective encryption key, thereby enabling the first client 120 to verify that the originator of the communication item indeed is a legitimate user or owner of the encrypted token even though there may not be a match between the source identifier associated with the communication item and any of the user identifiers of the accompanying token. In case the token is associated with user identifiers of a single second user only, the first client 120 may, additionally, conclude that the source identifier of the communication item is a new user identifier associated with the second user and the first client 120 may update or complement its database(s) accordingly. Steps 509 and 510 of the third example correspond to steps 409 and 410 of the second example.

In a variation of the third example of FIG. 11 the further second user 140' may have gained access to the token assigned to the user of the second device 140 in an illegitimate manner, but does not have knowledge of the respective encryption key. Hence, in this scenario the further second client 140' is not an entity operated by the second user, i.e. the user of the second client 140. Consequently, in this scenario the another second client 140' is not able to provide the respective encryption key together with the communication item and the token (in step 508) and, consequently, (in step 509) the first client 120 detects in the verification that none of the user identifiers of the token matches with the source identifier associated with the communication item and in absence of an encryption key as a proof of identity of the originator as a legitimate owner or assignee of the token the first client 120 may (in step 510) apply the screening rule e.g. to block the communication item and/or to inform the user of the first client 120 about an invalid token, as described in more detail by the examples hereinbefore.

In the foregoing, the exemplifying scenarios describe using the token to accompany an incoming communication item addressed to the client 120 or a user thereof. However, a token as described hereinbefore may also be employed in context of authorization. For example, in an instant messaging system or in a social media service e.g. a user account may be visible to or particulars of a user account and/or a status of a user account may be accessible only by a user that provides a token fulfilling a predefined criterion, e.g. a token that is associated with predetermined identifiers, when attempting to search/access the instant messaging system. As another example, the BT discovery process or the WLAN discovery process may employ a token such that a certain BT or WLAN device may be made visible/available only to a device providing a token fulfilling a predefined criterion in an attempt/request to access the certain BT/WLAN device. As a further example, a token may be employed, instead of or in addition to a PIN code, in a process of pairing two BT devices.

The operations, procedures, functions and/or methods described in context of the first client 120, the one or more second clients 140 and the server 160 may be provided as means for carrying out the corresponding operations, procedures, functions and/or method steps assigned to the above-mentioned entities. Such means may be provided as software means, as hardware means, or as a combination of software means and hardware means.

As an example, the client 120 may be provided as an apparatus comprising means for obtaining one or more tokens for screening incoming communication items to a first user, wherein a token is associated with one or more identifiers characterizing one or more communication items accompanying the token, means for encrypting the one or more tokens to create respective one or more encrypted tokens and means for providing the one or more encrypted tokens to one or more second users for subsequent use in communication to the first user to enable the first user to screen incoming communication items.

As another example, the client 120 may be, alternatively or additionally, provided as an apparatus comprising means for receiving an indication of one or more incoming communication items addressed to a first user and an encrypted token associated with one or more identifiers characterizing the one or more communication items, means for decrypting the encrypted token to derive a decrypted token to enable verification of the token, and means for applying a predetermined rule to screen incoming communication items, wherein said predetermined rule determines handling of the one or more incoming communication items at least on basis of the outcome of the verification.

Figure 12:
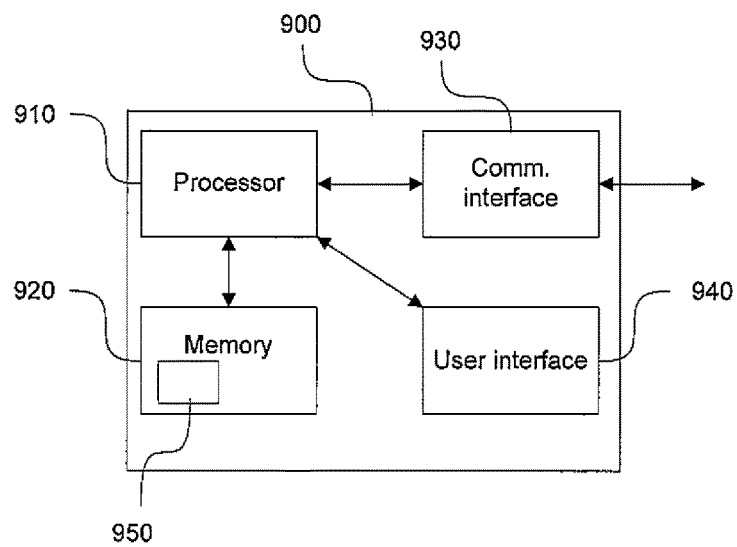
FIG. 12 schematically illustrates an exemplifying apparatus in accordance with an example embodiment.

FIG. 12 schematically illustrates an exemplifying apparatus 900 upon which an embodiment of the invention may be implemented. The apparatus 900 as illustrated in FIG. 9 provides a diagram of exemplary components of an apparatus, which is capable of operating as or providing the first client 120, the second client 140 or the server 160 in the example arrangement 100 of FIG. 1 according to an embodiment. The apparatus 900 comprises a processor 910, a memory 920 and a communication interface 930, such as a network card or a network adapter enabling wireless or wireline communication with another apparatus and/or radio transceiver enabling wireless communication with another apparatus over radio frequencies. The processor 910 is configured to read from and write to the memory 920. The apparatus 900 may further comprise a user interface 940 for providing data, commands and/or other input to the processor 910 and/or for receiving data or other output from the processor 910, the user interface 940 comprising for example one or more of a display, a keyboard or keys, a mouse or a respective pointing device, a touchscreen, etc. The apparatus 900 may comprise further components not illustrated in the example of FIG. 9.

Although the processor 910 is presented in the example of FIG. 9 as a single component, the processor 910 may be implemented as one or more separate components. Although the memory 920 in the example of FIG. 9 is illustrated as a single component, the memory 920 may be implemented as one or more separate components, some or all of which may be integrated/removable and/or may provide permanent/semi-permanent/dynamic/cached storage.

The apparatus 900 may be embodied for example as a mobile phone, a digital camera, a digital video camera, a music player, a gaming device, a laptop computer, a desktop computer, a personal digital assistant (PDA), an internet tablet, a television set, etc.—basically as any apparatus that is able to communicate with another apparatuses or that may be (re-)configured to be able to communicate with another apparatuses.

The memory 920 may store a computer program 950 comprising computer-executable instructions that control the operation of the apparatus 900 when loaded into the processor 910. As an example, the computer program 950 may include one or more sequences of one or more instructions. The computer program 950 may be provided as a computer program code. The processor 910 is able to load and execute the computer program 950 by reading the one or more sequences of one or more instructions included therein from the memory 920. The one or more sequences of one or more instructions may be configured to, when executed by one or more processors, cause an apparatus, for example the apparatus 900, to implement the operations, procedures and/or functions described hereinbefore in context of the first client 120, the second client 140 or the server 160.

Hence, the apparatus 900 may comprise at least one processor 910 and at least one memory 920 including computer program code for one or more programs, the at least one memory 920 and the computer program code configured to, with the at least one processor 910, cause the apparatus 900 to perform the operations, procedures and/or functions described hereinbefore in context of the first client 120, the second client 140 or the server 160.

The computer program 950 may be provided at the apparatus 900 via any suitable delivery mechanism. As an example, the delivery mechanism may comprise at least one computer readable non-transitory medium having program code stored thereon, the program code which when executed by an apparatus cause the apparatus at least implement processing to carry out the operations, procedures and/or functions described hereinbefore in context of the first client 120, the second client 140 or the server 160. The delivery mechanism may be for example a computer readable storage medium, a computer program product, a memory device a record medium such as a CD-ROM or DVD, an article of manufacture that tangibly embodies the computer program 950. As a further example, the delivery mechanism may be a signal configured to reliably transfer the computer program 950.

Reference to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

What is claimed is:

1. An apparatus comprising at least one processor and at least one memory including computer program code for one or more programs, the at least one memory and the computer program code configured to, with the at least one processor, cause the apparatus to perform at least the following:
obtain one or more tokens for processing incoming communication items to a first user in a predetermined manner based on information regarding type or origin of the incoming communication items, wherein a token is associated with one or more identifiers characterizing one or more communication items accompanying the token, the one or more identifiers comprising user identifiers of one or more second users that are being assigned the token,
encrypt the one or more tokens to create respective one or more encrypted tokens,
provide the one or more encrypted tokens to the one or more second users for subsequent use in communication to the first user to enable the first user to process the incoming communication items in accordance with the one or more identifiers,
verify an originator of the incoming communication items accompanied by the one or more encrypted tokens is the same as indicated by the one or more identifiers associated with the one or more communication items by comparing the one or more identifiers associated with the one or more encrypted tokens with the one or more identifiers associated with the one or more communication items, and
in response to determining the one or more identifiers of the one or more encrypted tokens do not match the one or more identifiers associated with the one or more communication items that are indicative of the originator of the incoming communication items, verify the originator of the incoming communication items by verifying that the incoming communication items accompanied by the one or more encrypted tokens further include a valid encryption key.

2. An apparatus according to claim 1, wherein the one or more identifiers comprises a type identifier indicative of priority level of the one or more communication items.

3. An apparatus according to claim 1 wherein the one or more identifiers comprises a type identifier indicative of a context of the one or more communication items.

4. An apparatus according to claim 1, wherein the token is provided as a Universally Unique Identifier (UUID) determined on basis of said identifier(s) the token is associated with.

5. An apparatus according to claim 1, wherein the one or more communication items comprise one of the following: a telephone call, a message of a short message service (SMS), a message of a multimedia messaging service (MMS), a message of an instant messaging service, or an email message.

6. An apparatus according to claim 1, wherein said encrypting comprises encrypting the one or more tokens on basis of the valid encryption key.

7. An apparatus according to claim 6, wherein said valid encryption key is received from the one or more second users.

8. An apparatus comprising at least one processor and at least one memory including computer program code for one or more programs, the at least one memory and the computer program code configured to, with the at least one processor, cause the apparatus to perform at least the following:
receive an indication of one or more incoming communication items addressed to a first user and an encrypted token, wherein the encrypted token is associated with one or more identifiers characterizing the one or more incoming communication items, wherein the encrypted token is based on information regarding type or origin of the one or more incoming communication items, the one or more identifiers comprising user identifiers of one or more second users that were assigned the encrypted token,
decrypt the encrypted token to derive a decrypted token to verify an originator of the one or more incoming communication items accompanied by the encrypted token is the same as indicated by the one or more identifiers associated with the one or more communication items, wherein verifying the originator is performed by comparing the one or more identifiers associated with the decrypted token with the one or more identifiers associated with the one or more communication items, and
apply a predetermined rule to process incoming communication items, wherein said predetermined rule further determines processing of the one or more incoming communication items at least based on an outcome of the verification of the originator of the one or more incoming communication items, wherein in response to the outcome indicating the one or more identifiers of the decrypted token do not match the one or more identifiers indicative of the originator of the one or more incoming communication items, verify the originator of the one or more incoming communication items by verifying that the one or more incoming communication items accompanied by the one or more encrypted tokens further include a valid encryption key.

9. A method comprising:
obtaining one or more tokens for processing incoming communication items to a first user in a predetermined manner based on information regarding type or origin of the incoming communication items, wherein a token is associated with one or more identifiers characterizing one or more communication items accompanying the token, the one or more identifiers comprising user identifiers of one or more second users that are being assigned the token,
encrypting the one or more tokens to create respective one or more encrypted tokens,
providing the one or more encrypted tokens to the one or more second users for subsequent use in communication to the first user to enable the first user to process the incoming communication items in accordance with the one or more identifiers,
verifying an originator of the incoming communication items accompanied by the one or more encrypted tokens is the same as indicated by the one or more identifiers associated with the one or more communication items by comparing the one or more identifiers associated with the one or more encrypted tokens with the one or more identifiers associated with the one or more communication items, and
in response to determining the one or more identifiers of the one or more encrypted tokens do not match the one or more identifiers associated with the one or more communication items that are indicative of the originator of the incoming communication items, verify the originator of the incoming communication items by verifying that the incoming communication items accompanied by the one or more encrypted tokens further include a valid encryption key.

10. A method according to claim 9, wherein the one or more identifiers comprises a type identifier indicative of priority level of the one or more communication items.

11. A method according to claim 9 wherein the one or more identifiers comprises a type identifier indicative of a context of the one or more communication items.

12. A method according to claim 9, wherein the token is provided as a Universally Unique Identifier (UUID) determined on basis of said identifier(s) the token is associated with.

13. A method according to claim 9, wherein the one or more communication items comprise one of the following: a telephone call, a message of a short message service (SMS), a message of a multimedia messaging service (MMS), a message of an instant messaging service, or an email message.

14. A method according to claim 9, wherein said encrypting comprises encrypting the one or more tokens on basis of the valid encryption key.

15. A method according to claim 14, wherein said valid encryption key is received from the one or more second users.

16. A method comprising:
receiving, at an apparatus, an indication of one or more incoming communication items addressed to a first user and an encrypted token, wherein the encrypted token is associated with one or more identifiers characterizing the one or more incoming communication items, wherein the encrypted token is based on information regarding type or origin of the one or more incoming communication items, the one or more identifiers comprising user identifiers of one or more second users that were assigned the encrypted token,
decrypting the encrypted token to derive a decrypted token to verify an originator of the one or more incoming communication items accompanied by the encrypted token is the same as indicated by the one or more identifiers associated with the one or more communication items, wherein verifying the originator is performed by comparing the one or more identifiers associated with the decrypted token with the one or more identifiers associated with the one or more communication items, and
applying a predetermined rule to process incoming communication items, wherein said predetermined rule further determines processing of the one or more incoming communication items at least based on an outcome of the verification of the originator of the one or more incoming communication items, wherein in response to the outcome indicating the one or more identifiers of the decrypted token do not match the one or more identifiers indicative of the originator of the one or more incoming communication items, verify the originator of the one or more incoming communication items by verifying that the one or more incoming communication items accompanied by the one or more encrypted tokens further include a valid encryption key.

17. The apparatus according to claim 1, wherein the user identifiers of the one or more second users comprise a name of a respective second user, a mailing address of the respective second user, an email address of the respective second user, a username to a predetermined service or system of the respective second user, or a telephone number of the respective second user.

18. The apparatus according to claim 8, wherein the user identifiers of the one or more second users comprise a name of a respective second user, a mailing address of the respective second user, an email address of the respective second user, a username to a predetermined service or system of the respective second user, or a telephone number of the respective second user.

19. The apparatus according to claim 1, wherein the at least one memory and the computer program code are further configured to, with the at least one processor, cause the apparatus to perform at least the following:
cause to display for selection, via a user interface, the one or more tokens for processing incoming communication items.

20. The method according to claim 9, further comprising:
causing to display for selection, via a user interface, the one or more tokens for processing incoming communication items.

* * * * *

UNITED STATES PATENT AND TRADEMARK OFFICE
CERTIFICATE OF CORRECTION

PATENT NO. : 10,193,692 B2  
APPLICATION NO. : 14/778485  
DATED : January 29, 2019  
INVENTOR(S) : Liao et al.

Page 1 of 1

It is certified that error appears in the above-identified patent and that said Letters Patent is hereby corrected as shown below:

In the Claims

Column 22  
Lines 38-39, "one or more encrypted tokens" should read –encrypted token–

Column 23  
Line 2, "verify" should read –verifying–

Column 24  
Line 14, "verify" should read –verifying–

Signed and Sealed this  
Nineteenth Day of November, 2019

Andrei Iancu  
*Director of the United States Patent and Trademark Office*